(12) United States Patent
Ferraris et al.

(10) Patent No.: US 6,426,399 B1
(45) Date of Patent: Jul. 30, 2002

(54) METHODS FOR THE SYNTHESIS AND POLYMERIZATION OF α,α'-DIHALO-P-XYLENES

(75) Inventors: John P. Ferraris, Coppell; Charles J. Neef, Garland, both of TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/502,953

(22) Filed: Feb. 11, 2000

(51) Int. Cl.$^7$ .............................. C08F 6/00; C08G 65/34
(52) U.S. Cl. .................. 528/489; 528/488; 528/492; 528/495; 528/503; 528/397
(58) Field of Search ................ 528/489, 488, 528/492, 495, 503, 397

(56) References Cited

U.S. PATENT DOCUMENTS

| | | | |
|---|---|---|---|
| 3,401,152 A | 9/1968 | Wessling et al. | 260/78.4 |
| 3,532,643 A | 10/1970 | Wessling et al. | 260/2 |
| 5,189,136 A | 2/1993 | Wudl et al. | 528/86 |

OTHER PUBLICATIONS

Antoniadis et al., "Photovoltaic and photoconductive properties of aluminum/poly(p–phenylene vinylene) interfaces," *Synth. Met.*, 62:265–271, 1994.

Denton et al., "Para–xylylenes and analogues by base–induced elimination from 1,4–bis–(dialklysulfoniomethyl) arene salts in poly (1,4–arylene vinylene) synthesis by the wessling soluble precursor method," *J. Polym. Sci. Part A: Polym. Chem.*, 30:2233–2240, 1992.

Denton et al., "The effect of radical trapping reagents upon formation of poly (α–tetrahydrothiophenio para–xylylene) polyelectrolytes by the wessling soluble precursor method," *J. Polym. Sci.. Part A: Polym. Chem.*, 30:2223–2231, 1992.

Friend and Greenham, "Electroluminescence in conjugated polymers," *Handbook of Conductive Polymers*, Marcel Dekker, Inc., NY, 29:823–845, 1998.

Gilch and Wheelwright, "Polymerization of α–halogenated p–xylenes with base," *J. Poly.Sci.*, 4:1337–1349, 1996.

Hontis et al., "Radical as well as anionic polymerisation mechanisms in the synthesis of poly(p–arylene vinylene precursors," *J. Polymer*, 40:6615–6617, 1999.

Hsieh et al., "A new family of highly emissive soluble poly(p–phenylene vinylene) derivatives; a step toward fully conjugated blue–emitting poly (p–phenylene vinylenes)," *J. Am. Chem. Soc.*, 120:231–232, 1998.

Hsieh et al., "General methodology toward soluble poly(p–phenylenevinylene) derivatives," *Macromol*, 30:8094–8095, 1997.

Issaris et al., "Polymerization of a p–quinodimethane derivative to a precursor of poly(p–phenylene vinylene)–indications for a free radical mechanism," *J. Polymer*, 38:2671–2574, 1997.

Lahti et al., "Polymerization of α,α'–bise(dialklysulfonio)–p–xylene dihalides via p–xylylene intermediates: evidence for a nonradical mechanism," *J. Am. Chem. Soc.*, 110:7258–7259, 1988.

Moratti, "The chemistry and uses of polyphenylenevinylenes," *Handbook of Conductive Polymers*, Marcel Dekker, Inc., NY, 13:343–361, 1998.

Parker et al., "Fabrication of a novel electro–optical intensity modulator from the conjugated polymer,poly(2, 5–dimethoxy–p–phenylene vinylene)," *Appl. Phys. Lett.*, 62:1519–1521, 1993.

*Primary Examiner*—Duc Truong
(74) *Attorney, Agent, or Firm*—Fulbright & Jaworski L.L.P.

(57) ABSTRACT

The present invention describes an improved method for the polymerization of α,α-dihalo-p-xylene's such as the α,α'-dihalo-2-methoxy-5-(2-ethylhexyloxy)-xylene's. The procedure for synthesis is based on the specific order of addition of reagents and the use of an anionic initiator that allows control of the molecular weight of the polymer. The molecular weight control allows processability of the polymer which is important for its utility in applications including in light-emitting-diodes, field effect transistors and photovoltaic devices.

75 Claims, 3 Drawing Sheets

METHODS FOR THE SYNTHESIS AND POLYMERIZATION OF α,α'-DIHALO-P-XYLENES

BACKGROUND OF THE INVENTION

1. Field of the Invention

The present invention relates generally to the fields of synthesis and polymerization of α,α'-dihalo-p-xylenes. More particularly, it concerns the use of a novel synthesis technique and the use of a novel anionic initiator that allows control of the molecular weight of the polymer.

2. Description of Related Art

Poly(p-phenylene vinylene)s (PPV) are of considerable interest for applications in light-emitting diodes (Friend and Greenham, 1998), field effect transistors (Parker et al., 1993), and photovoltaic devices (Antoniadis et al., 1994). Two approaches have generally been used in the art for the synthesis of PPVs: the Wessling route (Wessling and Zimmerman, 1968; 1970) and the Gilch route (Gilch and Wheelwright, 1966). The Wessling route involves treatment of p-xylylene sulfonium salts with an equal molar amount of base to form a soluble precursor polymer. The precursor polymer is then thermally treated to give the conjugated PPV. The Gilch route employs the treatment of α,α-dihalo-p-xylenes with potassium tert-butoxide in organic solvents. Alkyl or alkoxy substituents on the aromatic ring are often used to impart solubility to the PPV. One of the most widely studied PPVs is poly(1-methoxy-4-(2-ethylhexyloxy)-p-phenylene vinylene) (MEH-PPV) due to the enhanced solubility of this polymer (Wudl and Srdanov, 1993).

The mechanism of polymerization of MEH-PPV is not fully understood and several processes have been suggested (Moratti, 1998). The polymerization is believed to proceed through a reactive quinodimethane intermediate that has been observed from UV spectra (Lahti et al., 1988; Denton et al., 1992). However, the nature of the propagating species, radical or anionic, is not firmly established. Several reports have suggested a radical polymerization due to decreases in molecular weight with the addition of chain transfer agents such as anthracene or TEMPO (Denton et al., 1992; Issaris et al., 1997; Hontis et al., 1999). In contrast, the addition of 4-tert-butylbenzyl chloride resulted in an inverse relationship between the amount of benzyl chloride and molecular weight suggesting an anionic polymerization (Hsieh et al., 1997; Hsieh et al., 1998). Ambiguities in the polymerization mechanism reflect a need for the development of novel and better methods for the polymerization of α,α'-dihalo-p-xylenes.

SUMMARY OF THE INVENTION

The present invention overcomes these and other deficiencies in the art. Novel polymerization methods for the polymerization of α,α-dihalo-p-xylenes are described herein that provide methods to control the molecular weight of the polymer and to circumvent polymerization problems such as gelation or precipitation of polymer products during polymerization.

The inventors also describe studies that elucidate the polymerization mechanism of α,α-dihalo-p-xylenes. In one embodiment, the mechanism of polymerization of α,α'-dihalo-2-methoxy-5-(2-ethylhexyloxy)-xylene's is elucidated. In specific embodiments, the mechanism of polymerization of α,α'-dichloro'-2-methoxy-5-(2-ethylhexyloxy)-xylene; α,α'-dibromo-2-methoxy-5-(2-ethylhexyloxy)-xylene; α,α'-di-iodo-2-methoxy-5-(2-ethylhexyloxy)-xylene; and α,α'-difluoro-2-methoxy-5-(2-ethylhexyloxy)-xylene are described.

The inventors have further described agents that initiate and control the polymerization reaction. These agents affect the polymerization mechanism of the reaction and thereby control the molecular weight of the resulting polymer. In one aspect, the agent is an anionic initiator. In a specific aspect, the anionic initiator is a nucleophilic anion derived from alkyl alcohols, phenols, mercaptans, and thiophenols. 4-methoxyphenoxide is one such initiator which is preferred for the methods of this invention.

In embodiments concerning the polymerization of α,α-dihalo-p-xylenes, the order of addition of reagents used for the synthesis i.e. base to monomer or monomer to base are defined. Bases include but are not limited to metal hydrides such as sodium hydride or calcium hydride, alkyl metals such as butyl lithium, amides such as sodium amide or lithium diisopropyl amide, and alkoxides such as potassium tert-butoxide or sodium iso-propoxide with potassium tert-butoxide as the preferred base. In a specific embodiment, the order of addition of reagents for the polymerization of α,α'-dibromo-2-methoxy-5-(2-ethylhexyloxy)-xylene is described.

Other embodiments describe methods used to follow the progress of polymerization. For example, the use of a rheostat as a mechanical stirrer to detect in-situ changes in viscosity and to follow the polymerization process are described.

Thus, one embodiment describes methods for the polymerization of α,α'-dihalo-p-xylene's comprising: a) obtaining monomers of α,α'-dihalo-p-xylene's; b) adding a base to the monomers; c) adding an anionic initiator; and carrying out the polymerization. In one aspect of the invention the method yields polymer at about 66%.

In one embodiment of the invention the temperatures used for the polymerization had a range of from about −40° C. to 100° C. Thus, the reaction may be carried out at −40° C. −35° C., −30° C., −25° C., −20° C., −15° C., −10° C., −5° C., 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., 95° C., 100° C. The preferred temperature for the polymerization is 25° C.

In another embodiment, the α,α'-dihalo-p-xylene is α,α'-dihalo-2-methoxy-5-(2-ethylhexyloxy)-xylene. In specific embodiments, the α,α'-dihalo-2-methoxy-5-(2-ethylhexyloxy)-xylene is α,α'-dibromo-2-methoxy-5-(2-ethylhexyloxy)-xylene, α,α'-dichloro-2-methoxy-5-(2-ethylhexyloxy)-xylene, α,α'-di-iodo-2-methoxy-5-(2-ethylhexyloxy)-xylene or α,α'-di-fluoro-2-methoxy-5-(2-ethylhexyloxy)-xylene.

In one aspect of the method, the base is non-nucleophilic. Thus, the base can be an alkoxide. In a preferred aspect the alkoxide is potassium-tert-butoxide. In an alternative aspect the alkoxide is sodium iso-propoxide.

In alternative embodiments, the base is a metal hydride. In more specific aspects of this embodiment the metal hydride is sodium hydride or calcium hydride.

In still other alternative embodiments, the base is an alkyl metal. In specific aspects of this embodiment, the alkyl metal is butyl lithium.

In yet other alternative embodiments, the base is an amide and the amide is sodium amide or lithium diisopropyl amide.

In one embodiment the anionic initiator is a nucleophile. The anionic initiator can be any nucleophilic anion derived from alkyl alcohols, phenols, mercaptans, and thiophenols.

In a preferred embodiment 4-methoxyphenoxide is the initiator of choice.

In another embodiment a method for the polymerization of α,α'-dihalo-2-methoxy-5-(2-ethylhexyloxy)-xylene's is described wherein the molecular weight of the polymer can be controlled. This is accomplished by the use of an anionic initiator compound. The initiator compound is a neutral nucleophile such as an amine or a nucleophilic anion derived from alkyl alcohols, phenols such as 4-methoxyphenoxide, mercaptans, thiophenols or amines. The method also allows processability control. In other aspects the method includes monitoring the progress of the polymerization process by the use of a rheostat as a mechanical stirrer to detect in-situ changes in viscosity of the polymer formed.

As used in the specification and claims the words "a" and "an" when used in combination with the conjunction "comprising" denote "one or more than one".

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

A. THE PRESENT INVENTION

Figure 1:
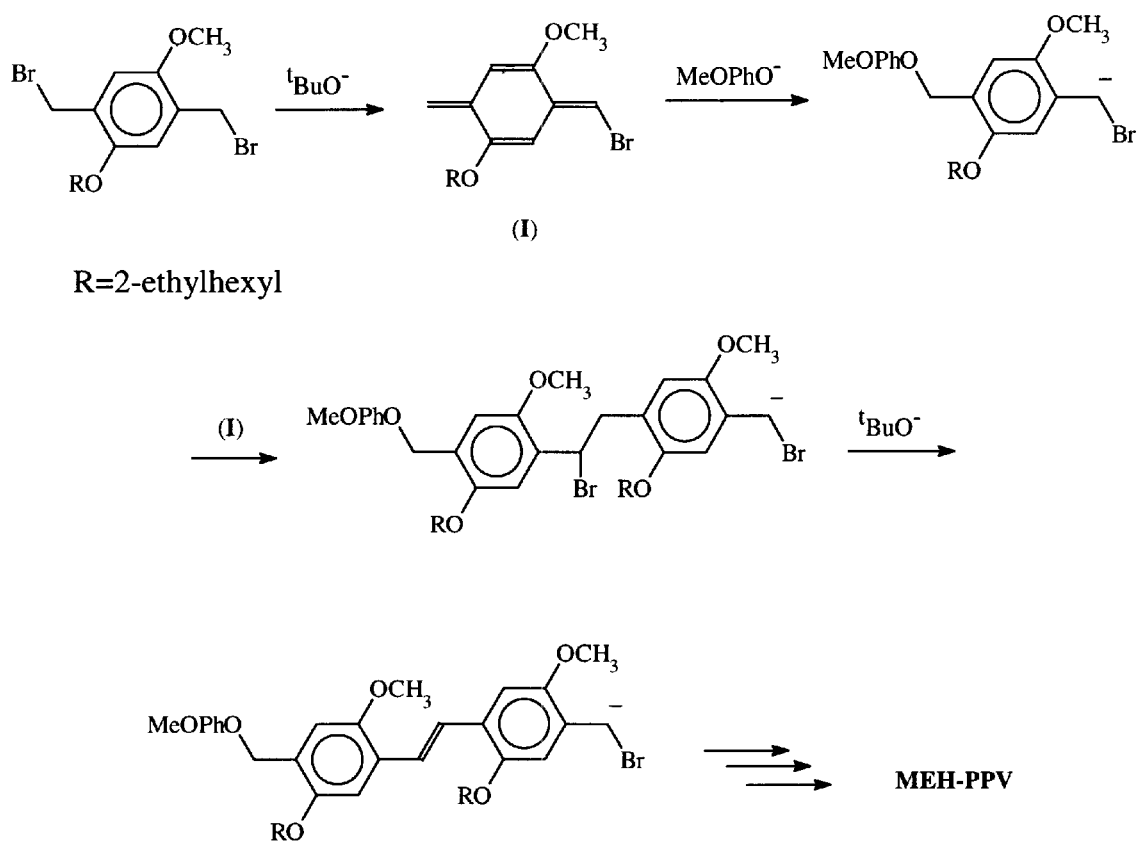
FIG. 1. Polymerization Mechanism of α,α'-dibromo-2-methoxy-5-(2-ethylhexyloxy)-xylene by Anionic Initiation.

The present invention is made possible by mechanistic studies on the polymerization of α,α'-dihalo-2-methoxy-5-(2-ethylhexyloxy)-xylene's, which allows the development of novel polymerization methods. In an example of the invention, a monomer of a α,α'-dihalo-2-methoxy-5-(2-ethylhexyloxy)-xylene is added to a base, such as potassium-tert-butoxide. The order of addition of reagents allows a better control of the polymerization kinetics. The polymerization is typically carried out in the presence of an initiator compound for example, potassium 4-methoxy phenoxide. The use of an initiator compound allows control of the molecular weight of the polymer. A typical yield of polymer in this reaction is about 66%.

The previously existing methods for the synthesis of these polymers involve the addition of base to monomer and do not use an initiator. Reversal of reagent addition and the addition of an initiator compound provide a vast improvement on the existing methods of synthesis and also provide a high yield of the polymer. Furthermore, the use of an initiator compound provides the ability to control the molecular weight of the polymer product which provides enhanced processability of the polymer.

Specifically, studies performed on the polymerization of α,α'-dibromo-2-methoxy-5-(2-ethylhexyloxy)-xylene are described. Polymerizations were carried out by adding monomer to potassium tert-butoxide in the presence of a nucleophile, 4-methoxyphenol. The molecular weight of the resulting polymer scaled linearly with the amount of 4-methoxyphenol indicating an anionic mechanism. The control of molecular weight enhances the processability of the polymer. In addition, each polymerization reaction was monitored by in-situ torque measurements to further elucidate the polymerization mechanism and optimize polymerization conditions.

B. APPLICATIONS OF THE PRESENT INVENTION

The MEH-PPV class of polymers which are soluble in common organic solvents are generally used for fabrication of shaped articles such as fibers, tapes, rods and films and are also useful as conducting polymers after oxidative doping. The method of polymerization of the α,α'-dihalo-2-methoxy-5-(2-ethylhexyloxy)-xylene's in the present invention allows for control of molecular weight of the polymers. This increases the processability of the polymers especially for applications such as, but not limited to, light-emitting-diodes; field effect transistors; and photovoltaic devices.

C. EXAMPLES

The following examples are included to demonstrate preferred embodiments of the invention. It should be appreciated by those of skill in the art that the techniques disclosed in the examples which follow, represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Method for Synthesis and Polymerization of Exemplary Compounds This example describes the synthesis of exemplary α,α'-dihalo-p-xylene compounds by the inventors. As an example, the polymerization of α,α'-dibromo-2-methoxy-5-(2-ethylhexyloxy)-xylene (abbreviated as MEH-PPV) as performed by the inventors is described herein. The anionic polymerization of α,α'-dibromo-2-methoxy-5-(2-ethylhexyloxy)-xylene is achieved herein by the addition of α,α'-dibromo-2-methoxy-5-(2-ethylhexyloxy)-xylene to excess base in the presence of an initiator. 4-methoxyphenol was used as an initiator and various amounts of 4-methoxyphenol (0, 0.5, 1.0, 1.5, and 2.0 mol %) were used by the inventors to control the molecular weight of the resulting polymer. A variety of base compounds may be used as described in the 'Summary of Invention' section, however, potassium-tert-butoxide is a preferred base. The p$K_a$ of 4-methoxyphenol allowed complete deprotonation by the base, for example, tert-butoxide and the resulting phenoxide behaved like a nucleophile and initiated the polymerization.

The procedures and reaction conditions used by the inventors are outlined below. To a solution of potassium tert-butoxide in THF (20 mL, 1.0 M); 4-methoxyphenol (0, 0 5. 1 0, 1.5, or 2.0 mol %); and dry THF (80 mL) was added to a round bottom flask, well flushed with $N_2$ and equipped with a rheostat as the mechanical stirrer. To this, a solution of α,α'-dibromo-2-methoxy-5-(2-ethylhexyloxy)-xylene (2.0 g, 4.74 mmol) in dry THF (20 mL) was then added at a rate of 20 mL/hr with a syringe pump. After complete addition of the monomer, the reaction mixture was stirred for an additional 16 hours. The reaction mixture was then poured into rapidly stirred methanol and the resulting polymer was collected by suction filtration. The polymer was purified by two additional precipitations, from THF into hexane and from THF into methanol. The polymer was then collected and dried under reduced pressure to give 0.62 to 0.88 g (50 to 72%) of MEH PPV. The inventors for most purposes used commercially available reagents. The THF was distilled from sodium-benzaphenone prior to use.

Example 2

Analysis of the Synthesis and Polymerization

Each polymerization reaction was monitored by in-situ torque measurements to further elucidate the polymerization mechanism and optimize polymerization conditions. The inventors also performed torque measurements which were recorded with a Contraves model 115 Rheomat/rheostat and plotted with a strip chart recorder.

Furthermore, molecular weights were measured with a Phenomenex phenogel (5 micron) column using a Viscotek T60 and LR40 triple detector and analyzed with TriSEC GPC Viscometry software (version 3.0).

Figure 2:
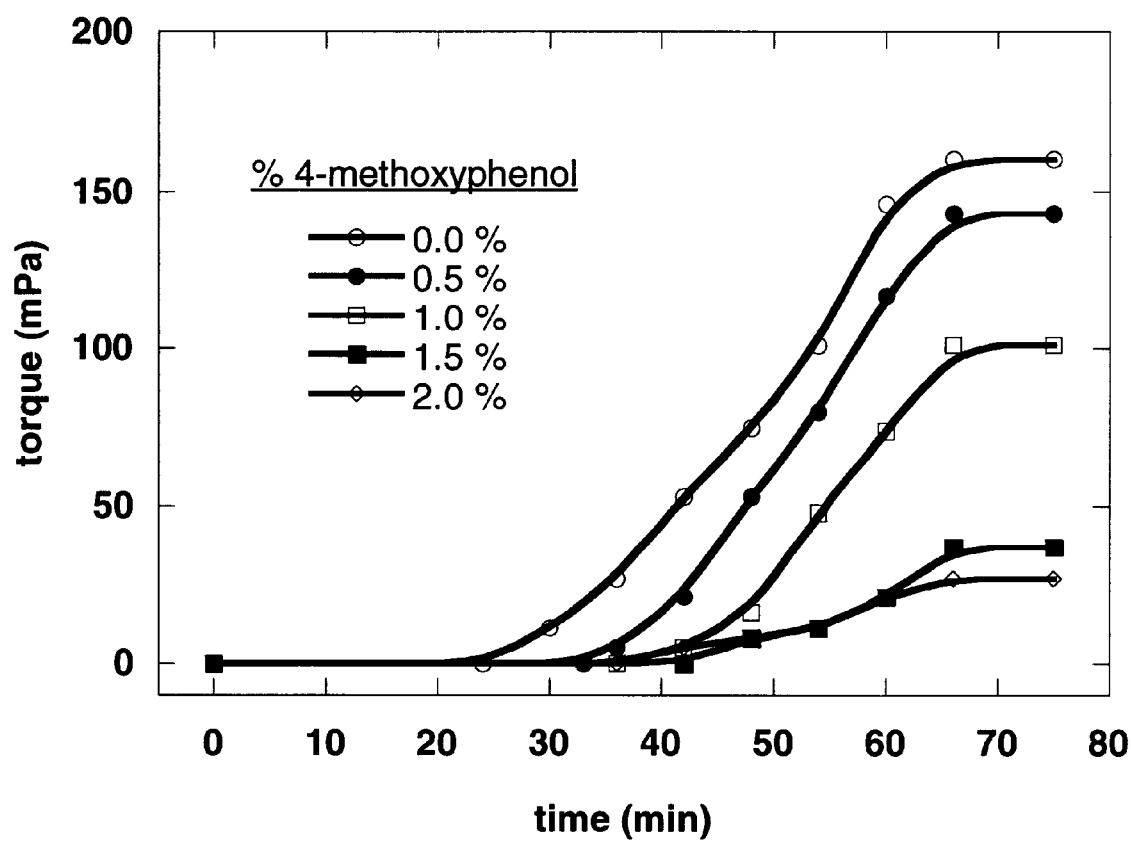
FIG. 2. Depicts Torque Measurements of Polymerizations With Various Amounts (0, 0.5, 1.0. 1.5, & 2.0 mol %) of 4-Methoxyphenolhenol.

The inventors observed that for the polymerization carried out in the presence of 0% 4-methoxyphenol, a change in torque was observed at ca. 25 m which continued to rise at a gradual rate, leveling off after complete addition of monomer as depicted in FIG. 2. The gradual rise in torque under this condition indicates an anionic polymerization. Thus, the addition of an appropriate amount of initiator can control the molecular weight of the polymer produced by the mechanism described above.

Figure 3:
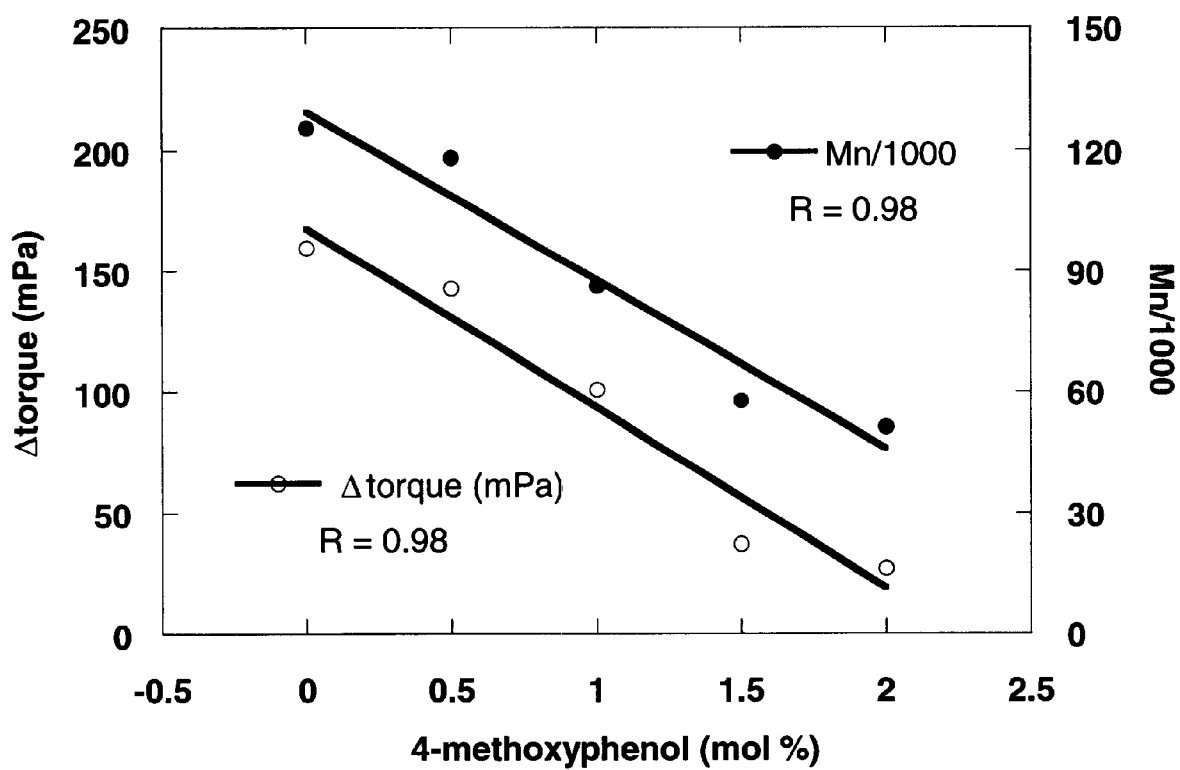
FIG. 3. Illustrates Molecular Weight and ΔTorque Versus % 4-Methoxyphenol for Polymerization Experiments.

Differences in the Δtorque and molecular weight as a function of the amount of 4-methoxyphenol were observed and these results are reported in the following Table (Table 1). As the amount of 4-methoxyphenol was increased, the Δtorque and $M_n$, values decreased. The polydispersity of the resulting polymers was also low, ranging from 1.04 to 1.52. These results are consistent with anionic initiation since anionic polymerization is known to have an inverse relationship between $M_n$ and the initiator, and to cause a lower polydispersity. Plots of Δtorque and $M_n$, vs. % 4-methoxyphenol are shown in FIG. 3. These plots show linear relationships between Δtorque and $M_n$ with % 4-methoxyphenol and clearly illustrate the control of molecular weight by this polymerization method. Also, the Δtorque was consistent with the $M_n$, of the corresponding polymer.

TABLE 1

Polymerization Results Versus the Amount of 4-Methoxyphenol

| % 4-methoxy-phenol | Δtorque (mPa)[a] | % yield | $M_n^b$ | PD[c] |
|---|---|---|---|---|
| 0 | 160 | 72 | 125,700 | 1.06 |
| 0.5 | 143 | 68 | 118,200 | 1.04 |

TABLE 1-continued

Polymerization Results Versus the Amount of 4-Methoxyphenol

| % 4-methoxy-phenol | Δtorque (mPa)[a] | % yield | $M_n^b$ | PD[c] |
|---|---|---|---|---|
| 1.0 | 101 | 67 | 86,200 | 1.52 |
| 1.5 | 37 | 56 | 57,700 | 1.43 |
| 2.0 | 27 | 50 | 51,300 | 1.14 |

[a]difference between initial and final torque
[b]number average molecular weight
[c]polydispersity In addition to molecular weight control and low polydispersity, this method of polymerization offers several advantages over the existing method of PPV synthesis. Addition of monomer to excess base provides a steady concentration of in situ generated quinodimethane resulting in better control of the polymerization kinetics. The control of molecular weight circumvents the problem of microgel formation observed with MEH-PPV (Hsieh et al., 1997). The inventors also envision the utility of this method for electron deficient monomers that are difficult to polymerize using the existing method of PPV synthesis.

In summary, the invention describes an improved polymerization method for the synthesis of MEH-PPV. This method utilizes a reversal in the addition of reagents, α,α'-dibromo-2-methoxy-5-(2-ethylhexyloxy)-xylene to potassium tert-butoxide, and the addition of an initiator to control the anionic polymerization. In addition, the molecular weight of the resulting polymer was linearly dependent on the amount of initiator. The molecular weight decreased as the amount of initiator was increased. These results are consistent with an anionic polymerization mechanism.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Antoniadis, Hsieh, Abkowitz, Jenekhe, Stolka, *Synth. Met.*, 62:625, 1994.
Denton, Lahti, Garay, Karasz, J. *Polym. Sci. Part A: Polym. Chem.*, 1992, 30:2223, 1992.
Denton, Sarker, Lahti, Garay, Karasz, J. *Polym. Sci. Part A: Polym. Chem.*, 30:2233, 1992.
Friend and Greenham, "Handbook of conductive polymers," Marcel Dekker, Inc., N.Y., 823, 1998.
Gilch and Wheelwright, *Polym. Sci. Part A: Polym. Chem.*, 4:1337, 1996.

Hontis, Van Der Borght, Vanderzande, Gelan, *J. Polymer*, 40:6615, 1999.
Hsieh, Yu, Forsythe, Schaaf, Feld, *J. Am. Chem. Soc.*, 120:231, 1998.
Hsieh, Yu, VanLaeken, Lee, *Macromol*, 30:8094, 1997.
Issaris, Vanderzande, Gelan, *J. Polymer*, 38:2671, 1997
Lahti, Modarelli, Denton, Lenz, Karasz, *J. Am. Chem. Soc.*, 110:7258, 1988.
Moratti, "Handbook of conductive polymers," Marcel Dekker, Inc., N.Y., 343, 1998.
Parker, Gymer, Harrison, Friend, Ahmend, *Appl. Phys. Let.*, 62:1519, 1993.
Wessling and Zimmerman, U.S. Pat. No. 3,401,152 (1968)
Wessling and Zimmerman, U.S. Pat. No. 3,532,643 (1970)
Wudl and Srdanov, U.S. Pat. No. 5,189,136 (1993)

What is claimed is:

1. A method for the polymerization of $\alpha,\alpha'$-dihalo-p-xylene's comprising:
   a) obtaining monomers of $\alpha,\alpha'$-dihalo-p-xylene's;
   b) adding a base to said monomers;
   c) adding an anionic initiator; and carrying out said polymerization.
2. The method of claim 1, wherein said polymerization is carried out at a temperature range of between −40° C. to about 100° C.
3. The method of claim 2, wherein the preferred temperature is 25° C.
4. The method of claim 1, wherein said $\alpha,\alpha'$-dihalo-p-xylene is $\alpha,\alpha'$-dihalo-2-methoxy-5-(2-ethylhexyloxy)-xylene.
5. The method of claim 4, wherein said $\alpha,\alpha'$-dihalo-2-methoxy-5-(2-ethylhexyloxy)-xylene is $\alpha,\alpha'$-dibromo-2-methoxy-5-(2-ethylhexyloxy)-xylene.
6. The method of claim 4, wherein said $\alpha,\alpha'$-dihalo-2-methoxy-5-(2-ethylhexyloxy)-xylene is of $\alpha,\alpha'$-dichloro-2-methoxy-5-(2-ethylhexyloxy)-xylene.
7. The method of claim 4, wherein said $\alpha,\alpha'$-dihalo-2-methoxy-5-(2-ethylhexyloxy)-xylene is of $\alpha,\alpha'$-di-iodo-2-methoxy-5-(2-ethylhexyloxy)-xylene.
8. The method of claim 1, wherein said base is non-nucleophilic.
9. The method of claim 8, wherein said base is an alkoxide.
10. The method of claim 9, wherein said alkoxide is potassium-tert-butoxide.
11. The method of claim 9, wherein said alkoxide is sodium iso-propoxide.
12. The method of claim 8, wherein said base is a metal hydride.
13. The method of claim 12, wherein said metal hydride is sodium hydride.
14. The method of claim 12, wherein said metal hydride is calcium hydride.
15. The method of claim 8, wherein said base is a alkyl metal.
16. The method of claim 15, wherein said alkyl metal is butyl lithium.
17. The method of claim 8, wherein said base is an amide.
18. The method of claim 17, wherein said amide is sodium amide.
19. The method of claim 17, wherein said amide is lithium diisopropyl amide.
20. The method of claim 1, wherein said anionic initiator is a nucleophile.
21. The method of claim 1, wherein said anionic initiator is a nucleophilic anion derived from the group comprising alkyl alcohols, phenols, mercaptans, amines and thiophenols.
22. The method of claim 21, wherein said anionic initiator is 4-methoxyphenoxide.
23. The method of claim 1, wherein the yield is about 66%.
24. A method for the polymerization of $\alpha,\alpha'$-dihalo-2-methoxy-5-(2-ethylhexyloxy)-xylene's wherein the molecular weight of said polymer can be controlled.
25. The method of claim 24, wherein said molecular weight is controlled using an anionic initiator compound.
26. The method of claim 25, wherein said anionic initiator is a nucleophile.
27. The method of claim 26, wherein said anionic initiator is 4-methoxyphenol.
28. The method of claim 25, further comprising processability control.
29. A method for the polymerization of $\alpha,\alpha'$-dibromo-2-methoxy-5-(2-ethylhexyloxy)-xylene comprising:
   a) obtaining monomers of $\alpha,\alpha'$-dibromo-2-methoxy-5-(2-ethylhexyloxy)-xylene;
   b) adding potassium-tert-butoxide to said monomers;
   c) adding 4-methoxyphenoxide; and carrying out said polymerization.
30. A method for the polymerization of $\alpha,\alpha'$-dihalo-p-xylenes comprising:
   (a) obtaining monomers of $\alpha,\alpha'$-dihalo-p-xylenes;
   (b) adding a base to said monomers in the presence of an anionic initiator, wherein said anionic initiator is a nucleophilic anion derived from the group comprising alkyl alcohols, phenols, mercaptans, amines and thiophenols, to create a mixture; and
   (c) polymerizing said mixture in a polymerization.
31. The method of claim 30, wherein said polymerization is carried out at a temperature range of between −40° C. to about 100° C.
32. The method of claim 31, wherein the preferred temperature is 25° C.
33. The method of claim 30, wherein said $\alpha,\alpha'$-dihalo-p-xylene is $\alpha,\alpha'$-dihalo-2-methoxy-5-(2-ethylhexyloxy)-xylene.
34. The method of claim 33, wherein said $\alpha,\alpha'$-dihalo-2-methoxy-5-(2-ethylhexyloxy)-xylene is $\alpha,\alpha'$-dibromo-2-methoxy-5-(2-ethylhexyloxy)-xylene.
35. The method of claim 33, wherein said $\alpha,\alpha'$-dihalo-2-methoxy-5-(2-ethylhexyloxy)-xylene is of $\alpha,\alpha'$-dichloro-2-methoxy-5-(2-ethylhexyloxy)-xylene.
36. The method of claim 33, wherein said $\alpha,\alpha'$-dihalo-2-methoxy-5-(2-ethylhexyloxy)-xylene is of $\alpha,\alpha'$-di-iodo-2-methoxy-5-(2-ethylhexyloxy)-xylene.
37. The method of claim 30, wherein said base is non-nucleophilic.
38. The method of claim 37, wherein said base is an alkoxide.
39. The method of claim 38, wherein said alkoxide is potassium-tert-butoxide.
40. The method of claim 38, wherein said alkoxide is sodium iso-propoxide.
41. The method of claim 37, wherein said base is a metal hydride.
42. The method of claim 41, wherein said metal hydride is sodium hydride.
43. The method of claim 41, wherein said metal hydride is calcium hydride.
44. The method of claim 37, wherein said base is an alkyl metal.
45. The method of claim 44, wherein said alkyl metal is butyl lithium.

46. The method of claim 37, wherein said base is an amide.

47. The method of claim 46, wherein said amide is sodium amide.

48. The method of claim 47, wherein said amide is lithium diisopropyl amide.

49. The method of claim 30, wherein said anionic initiator is a nucleophile.

50. The method of claim 30, wherein said anionic initiator is 4-methoxyphenoxide.

51. The method of claim 30, wherein the yield is about 66%.

52. A method for the polymerization of $\alpha,\alpha'$-dihalo-p-xylenes comprising:
(a) obtaining monomers of $\alpha,\alpha'$-dihalo-p-xylenes;
(b) adding said monomers to a base in the presence of an anionic initiator to create a mixture; and
(c) polymerizing said mixture in a polymerization.

53. The method of claim 52, wherein said polymerization is carried out at a temperature range of between $-40°$ C. to about $100°$ C.

54. The method of claim 53, wherein the preferred temperature is $25°$ C.

55. The method of claim 52, wherein said $\alpha,\alpha'$-dihalo-p-xylene is x,o'-dihalo-2-methoxy-5-(2-ethylhexyloxy)-xylene.

56. The method of claim 55, wherein said $\alpha,\alpha'$-dihalo-2-methoxy-5-(2-ethylhexyloxy)-xylene is $\alpha,\alpha'$-dibromo-2-methoxy-5-(2-ethylhexyloxy)-xylene.

57. The method of claim 55, wherein said $\alpha,\alpha'$-dihalo-2-methoxy-5-(2-ethylhexyloxy)-xylene is of $\alpha,\alpha'$-dichloro-2-methoxy-5-(2-ethylhexyloxy)-xylene.

58. The method of claim 55, wherein said $\alpha,\alpha'$-dihalo-2-methoxy-5-(2-ethylhexyloxy)-xylene is of $\alpha,\alpha'$-di-iodo-2-methoxy-5-(2-ethylhexyloxy)-xylene.

59. The method of claim 52, wherein said base is non-nucleophilic.

60. The method of claim 59, wherein said base is an alkoxide.

61. The method of claim 60, wherein said alkoxide is potassium-tert-butoxide.

62. The method of claim 60, wherein said alkoxide is sodium iso-propoxide.

63. The method of claim 59, wherein said base is a metal hydride.

64. The method of claim 63, wherein said metal hydride is sodium hydride.

65. The method of claim 63, wherein said metal hydride is calcium hydride.

66. The method of claim 59, wherein said base is an alkyl metal.

67. The method of claim 66, wherein said alkyl metal is butyl lithium.

68. The method of claim 59, wherein said base is an amide.

69. The method of claim 68, wherein said amide is sodium amide.

70. The method of claim 68, wherein said amide is lithium diisopropyl amide.

71. The method of claim 52, wherein said anionic initiator is a nucleophile.

72. The method of claim 52, wherein said anionic initiator is a nucleophilic anion derived from the group comprising alkyl alcohols, phenols, mercaptans, amines and thiophenols.

73. The method of claim 72, wherein said anionic initiator is 4-methoxyphenoxide.

74. The method of claim 52, wherein the yield is about 66%.

75. A method for the polymerization of $\alpha,\alpha'$-dibromo-2-methoxy-5-(2-ethylhexyloxy)-xylene comprising:
(a) obtaining monomers of $\alpha,\alpha'$-dibromo-2-methoxy-5-(2-ethylhexyloxy)-xylene;
(b) adding said monomers to potassium-tert-butoxide in the presence of 4-methoxyphenoxide to create a mixture; and
(c) polymerizing said mixture in a polymerization.

* * * * *

UNITED STATES PATENT AND TRADEMARK OFFICE
CERTIFICATE OF CORRECTION

PATENT NO. : 6,426,399 B1
DATED : July 30, 2002
INVENTOR(S) : Ferraris et al.

It is certified that error appears in the above-identified patent and that said Letters Patent is hereby corrected as shown below:

Column 7,
Line 16, please delete "α, α'-dihalo-p-xylene's" and insert -- α, α'-dihalo-p-xylenes -- therefor.
Line 18, please delete "α, α'-dihalo-p-xylene's" and insert -- α, α'-dihalo-p-xylenes -- therefor.

Column 8,
Line 5, please delete "α, α'-dihalo-2-methoxy-5-(2-ethylhexyloxy)-xylene's" and insert -- α, α'-dihalo-2-methoxy-5-(2-ethylhexyloxy)-xylenes -- therefor.

Column 9,
Line 25, please delete "x,o'-dihalo-2-methoxy-5-(2-ethylhexyloxy)-xylene" and insert -- α, α'-dihalo-2-methoxy-5-(2-ethylhexyloxy)-xylene -- therefor.

Signed and Sealed this

Nineteenth Day of November, 2002

*Attest:*

*Attesting Officer*

JAMES E. ROGAN
*Director of the United States Patent and Trademark Office*